No. 736,724. PATENTED AUG. 18, 1903.
P. T. HANDIGES.
DRAFT AND BUFFING MECHANISM.
APPLICATION FILED SEPT. 22, 1902.
NO MODEL. 2 SHEETS—SHEET 2.
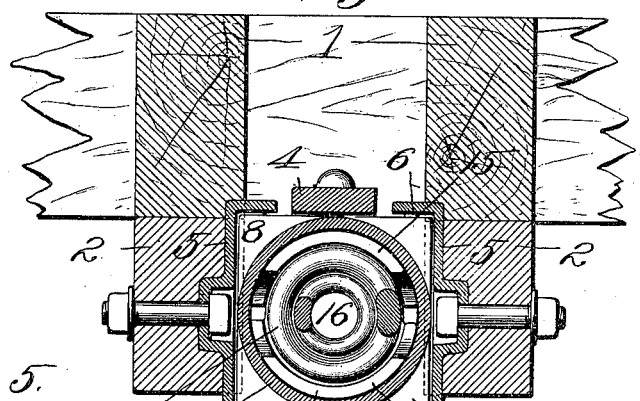
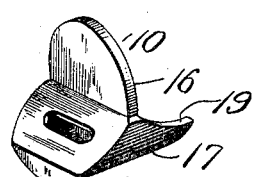
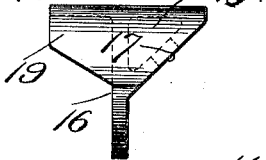
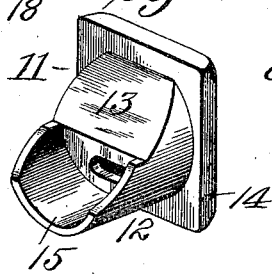
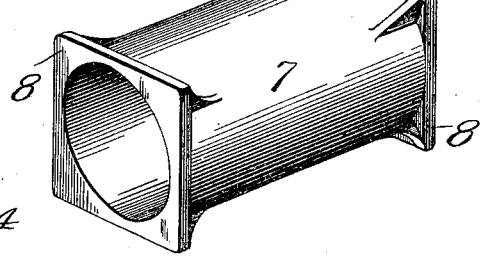
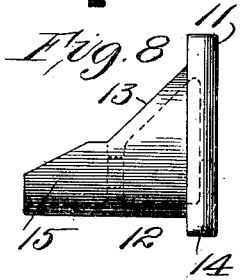
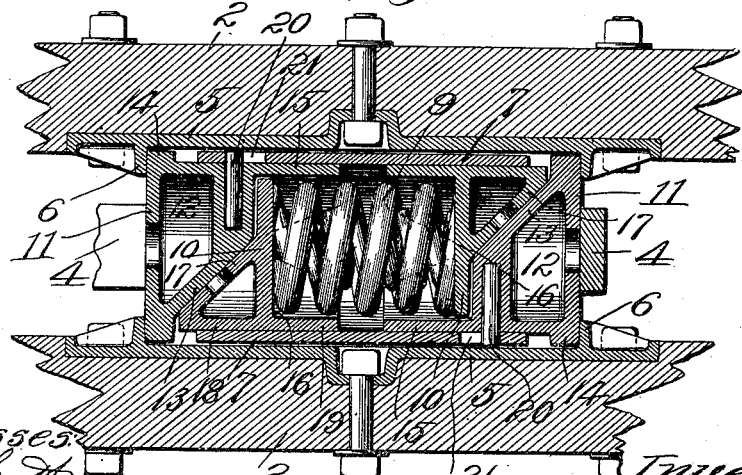
Witnesses:
Inventor:
Philip T. Handiges,
by Bakewell & Cornwall
attys.

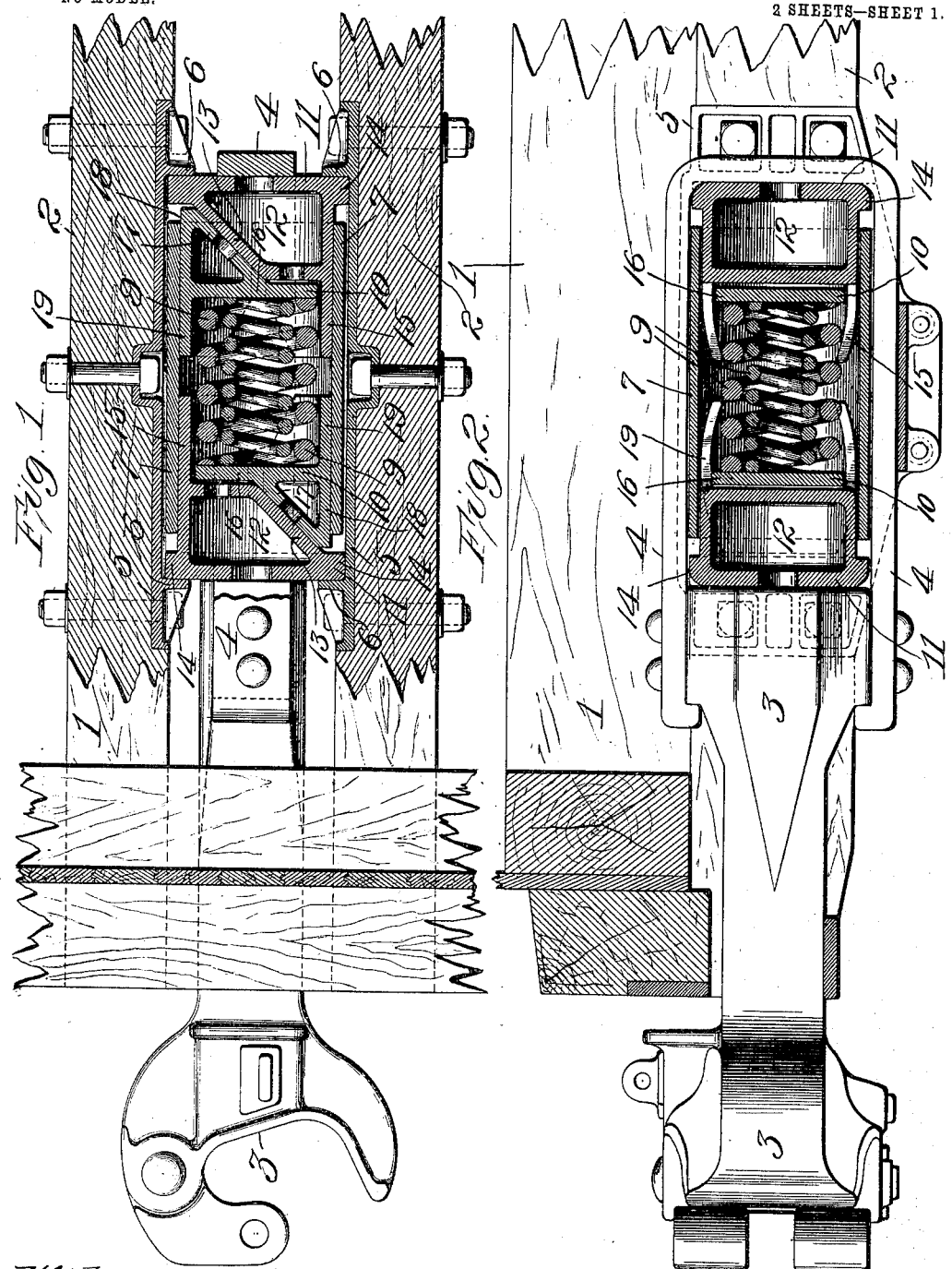

No. 736,724. Patented August 18, 1903.

UNITED STATES PATENT OFFICE.

PHILIP T. HANDIGES, OF ST. LOUIS, MISSOURI.

DRAFT AND BUFFING MECHANISM.

SPECIFICATION forming part of Letters Patent No. 736,724, dated August 18, 1903.

Application filed September 22, 1902. Serial No. 124,394. (No model.)

*To all whom it may concern:*

Be it known that I, PHILIP T. HANDIGES, a citizen of the United States, residing at St. Louis, Missouri, have invented a certain new and useful Improvement in Draft and Buffing Mechanism, of which the following is a full, clear, and exact description, such as will enable others skilled in the art to which it appertains to make and use the same, reference being had to the accompanying drawings, forming part of this specification, in which—

Figure 1 is a top view partly in plan and partly in section. Fig. 2 is a view partly in side elevation and partly in longitudinal section. Fig. 3 is a transverse sectional elevation. Fig. 4 is a perspective view of the floating cylinder. Figs. 5 and 6 are perspective views of the spring-seat and follower, respectively. Figs. 7 and 8 are views of said parts in side elevation, and Fig. 9 is a horizontal sectional view of a modification or development of the invention.

My invention relates to draft and buffing mechanisms, and is particularly designed as a frictional draft-rigging for railway-cars, although it is in no wise limited to such application, the mechanism being useful for other purposes, such as checking the recoil of heavy ordnance, &c.

Among my objects are to so construct the device that it includes but few parts, that a large area of frictionally-engaged surfaces is presented, and that the structure is equally effective for the desired purposes whether it be subjected to buffing or draft strains.

To these ends and also to improve generally upon mechanism of the character indicated my invention consists in the various matters hereinafter described and claimed.

In the accompanying drawings I have shown the invention applied to a railway-car of usual construction, 1 representing the center sills, 2 the draft-sills, 3 the draw-bar, 4 the usual strap or yoke connected thereto, and 5 the cheek-plates, which are here shown as connected to the draft-sills in a well-understood manner and are provided with the usual stop lugs or projections 6. It will of course be obvious that in cars of metal construction the cheek-plates can be fastened upon the center sills, the draft-sills being omitted.

Supported between the cheek-plates is a floating cylindrical casing 7, which is movable longitudinally and is preferably provided with squared ends or heads 8 to prevent turning of said casing. A spring or springs 9 of usual type are housed within said cylinder and extend longitudinally thereof, and at opposite ends of the spring or springs are movable spring-seats 10, which abut against followers 11, the entire structure being included between the inner end of the draw-bar and the connecting portion of the yoke. Each follower has a body portion 12, which fits within the open end of the cylinder and is provided with an inclined wall 13, so that said body portion is practically wedge-shaped. Upon the outer end of said body portion is a squared head 14, which is adapted to engage the stop-lugs of the cheek-plates, and upon the inner end of the said body portion is a substantially semicircular extension 15, which is practically a continuation of the wall of said body portion. Each spring-seat has a seat-plate 16, from the outer side of which extends a body portion 17, which is wedge-shaped and provided with a curved wall 18, adapted to fit within the cylinder, a substantially semicircular extension 19 projecting upon the inner side of said seat-plate. When assembled, the inclined walls of a follower and its adjacent spring-seat abut each other and the two wedge-shaped body portions complement each other to form a substantially cylindrical plunger movable in the cylinder, the two semicircular extensions lying about the spring and, together with the walls of the body portions of the seat and follower, engaging the inner wall of the cylinder over a large area. When the spring is in its normal extended condition, the heads of the followers lie against the stop-lugs at the opposite ends of the cheek-plates, the cylinder lies between the said heads of the followers with its ends spaced therefrom, so that the cylinder is permitted to have longitudinal movement, and the end of each spring-seat is spaced from the head of the adjacent follower, while the seat-plate of such seat is spaced from the body portion of the follower, thus permitting a follower and its adjacent seat-plate to move toward each other. The inner end of the draw-bar engages the outer side of what may be termed the "outer" follower, and the connecting portion of the strap or yoke engages the outer side of the inner follower.

Assuming that the parts are in their normal positions, as just described and as illustrated in the drawings, if the draw-bar is subjected to a buffing strain the forward or outer follower is pushed backward against its adjacent spring-seat, backward movement of this seat is resisted by the spring, the rear spring-seat is through the medium of the spring forced backwardly against the rear follower, and this rear follower is held against backward movement by the stop-lugs. Consequently the forward follower and spring-seat are forced toward each other and the rear spring-seat is forced toward its adjacent follower, and this action, because of the wedge relation between each follower and spring-seat, causes said parts to be forced outwardly against the inner wall of the floating cylinder. Thus the spring-seats and followers frictionally engage the cylinder over a large surface, and the frictionally-engaged surfaces of the said seats and followers are evenly pressed against the cylinder and not tilted with relation thereto. As the springs yield the forward follower and spring-seat move inwardly and the cylinder is forced along the rear seat and follower, the frictional engagement causing the force acting upon the draw-bar to be dissipated and preventing excessive recoil, all as will be readily apparent. When the draw-bar is subjected to draft strain, the rear seat and follower act, as do the forward seat and follower, under buffing strain, and vice versa. Preferably each follower is provided with a pin 20, which projects into an elongated slot 21 in the floating cylinder. Thus should the cylinder be forced toward one end of the cheek-plates during the time that the mechanism is under strain the pin of the follower which has moved with the cylinder will engage the cylinder as said follower is forced to normal position by the expansion of the spring when the strain is removed, and the cylinder will thus be restored to normal central position.

It will be noted that the mechanism includes but few parts, that these parts can be readily made and assembled, that under strain in either direction the surfaces of the movable members are frictionally engaged over a large area, and that the engaged surfaces are not tilted or canted, but are flatly forced against each other.

I am aware that many minor changes in the construction, arrangement, and combination of the several parts of my device can be made and substituted for those herein shown and described without in the least departing from the nature and principle of my invention.

Having thus described my invention, what I claim as new, and desire to secure by Letters Patent, is—

1. In a mechanism of the character indicated, a floating friction member, a set of friction members at each end of said floating friction member, and means whereby when the mechanism is subjected to strain the friction members of each of said sets are caused to move with respect to each other toward said floating friction member to frictionally engage said floating friction member and the friction members of one of said sets are moved in the line of movement of said floating friction member; substantially as described.

2. In a mechanism of the character indicated, a floating friction member, a spring, spring-seats at opposite ends of said spring and having frictional engagement with said floating friction member, a follower coöperating with each of said spring-seats and also having frictional engagement with said floating friction member, and means whereby when the mechanism is subjected to strain, both sets of the said spring-seats and followers are caused to frictionally engage said floating friction member; substantially as described.

3. In a mechanism of the character indicated, a floating friction member, a spring, spring-seats at opposite ends of said spring and having frictional engagement with said friction member, and followers having wedging engagement with said spring-seats and also frictionally engaging the friction member; substantially as described.

4. In a mechanism of the character indicated, a floating casing, a spring therein, spring-seats in said casing at opposite ends of said spring and having frictional engagement with said casing, and followers having wedging engagement with said spring-seats and also frictionally engaging said casing; substantially as described.

5. In a mechanism of the character indicated, the combination with cheek-plates having stops at opposite ends, and a draw-bar and its yoke, of a floating casing between said cheek-plates, a spring within said casing, spring-seats in said casing at opposite ends of said spring and having frictional engagement with said casing, and followers coöperating with said stops, having wedging engagement with said seats and also having frictional engagement with said casing, said followers, seats and spring being included within the said yoke; substantially as described.

6. In a mechanism of the character indicated, a floating casing, spring-seats in said casing at opposite ends thereof and having body portions and an extension projecting inwardly therefrom, said spring-seats frictionally engaging said casing, followers in wedging engagement with said spring-seats and having body portions and extensions projecting therefrom, said followers frictionally engaging said casing, and a spring within said casing and seated against said seats, the said extensions of a seat and its coöperating follower lying about said spring; substantially as described.

7. In a mechanism of the character indicated, a floating friction member, a spring-pressed coöperating friction member, and loose connection between said friction members whereby they can move independently of each other and, as said spring-pressed member is restored to normal position, it moves said coöperating friction member into normal position; substantially as described.

8. In a mechanism of the character indicated, a floating casing, spring-seats within the same and frictionally engaging opposite ends thereof, followers having wedging engagement with said seats and also frictionally engaging said casing, a spring seated between said seats, and loose connection between said casing and one of said spring-pressed parts; substantially as described.

9. In a mechanism of the character indicated, a floating casing, spring-seats within the same and frictionally engaging opposite ends thereof, followers having wedging engagement with said seats and also frictionally engaging said casing, a spring seated between said seats, and slot-and-pin connection between said casing and one of the spring-pressed parts at each end of said casing; substantially as described.

In testimony whereof I hereunto affix my signature, in the presence of two witnesses, this 18th day of September, 1902.

PHILIP T. HANDIGES.

Witnesses:
 GALES P. MOORE,
 GEORGE BAKEWELL.